(12) United States Patent
Huntington

(10) Patent No.: US 6,849,292 B1
(45) Date of Patent: Feb. 1, 2005

(54) MANUFACTURE OF SOLID STATE CAPACITORS

(75) Inventor: David Huntington, Bovey Tracey (GB)

(73) Assignee: AVX Limited (GB)

( * ) Notice: Subject to any disclaimer, the term of this patent is extended or adjusted under 35 U.S.C. 154(b) by 0 days.

(21) Appl. No.: 10/048,437

(22) PCT Filed: Aug. 9, 2000

(86) PCT No.: PCT/GB00/03058

§ 371 (c)(1), (2), (4) Date: Aug. 19, 2002

(87) PCT Pub. No.: WO01/11638

PCT Pub. Date: Feb. 15, 2001

(30) Foreign Application Priority Data

Aug. 10, 1999 (GB) .............................................. 9918852

(51) Int. Cl.⁷ .............................. B05D 5/12; H01G 7/00
(52) U.S. Cl. ............................ 427/79; 427/80; 427/81; 29/25.03; 29/25.41; 29/25.42
(58) Field of Search ............................. 427/79, 80, 81; 29/25.03, 25.41, 25.42

(56) References Cited

U.S. PATENT DOCUMENTS

| | | | | |
|---|---|---|---|---|
| 3,889,357 A | * | 6/1975 | Millard et al. | ............. 29/25.03 |
| 4,599,788 A | * | 7/1986 | Love et al. | ................ 29/25.03 |
| 4,796,560 A | * | 1/1989 | Berger et al. | ................ 118/211 |
| 5,075,940 A | * | 12/1991 | Kuriyama et al. | ......... 29/25.03 |
| 5,357,399 A | | 10/1994 | Salisbury | |
| 5,834,062 A | * | 11/1998 | Johnson et al. | ............. 427/256 |

FOREIGN PATENT DOCUMENTS

WO    WO0028559    5/2000

* cited by examiner

*Primary Examiner*—Brian K. Talbot
(74) *Attorney, Agent, or Firm*—Dority & Manning, P.A.

(57) ABSTRACT

The present invention concerns the field of solid state capacitors and relates particularly to massed production methods for manufacturing solid state capacitors. According to one aspect of the invention there is provided a method of manufacturing multiple solid state capacitors comprising: providing a substrate layer; forming on an upper surface of the substrate layer a plurality of upstanding bodies consisting of porous sintered valve-action material; forming an insulating layer on and extending through the porosity of the bodies; forming a conducting cathode layer on the insulating layer; and forming cathode termination means on a top portion of each body; and dividing the processed substrate to form a plurality of individual capacitor bodies in each of which a portion of the substrate forms an anode terminal, a porous body is an anode body having cathode termination means provided on a top portion thereof, characterized in that the upstanding porous bodies are formed by pressing valve-action metal powder/binder mixture onto the substrate and forming the required body shapes and distribution while the mixture is in the green state and subsequently sintering the bodies.

6 Claims, 3 Drawing Sheets

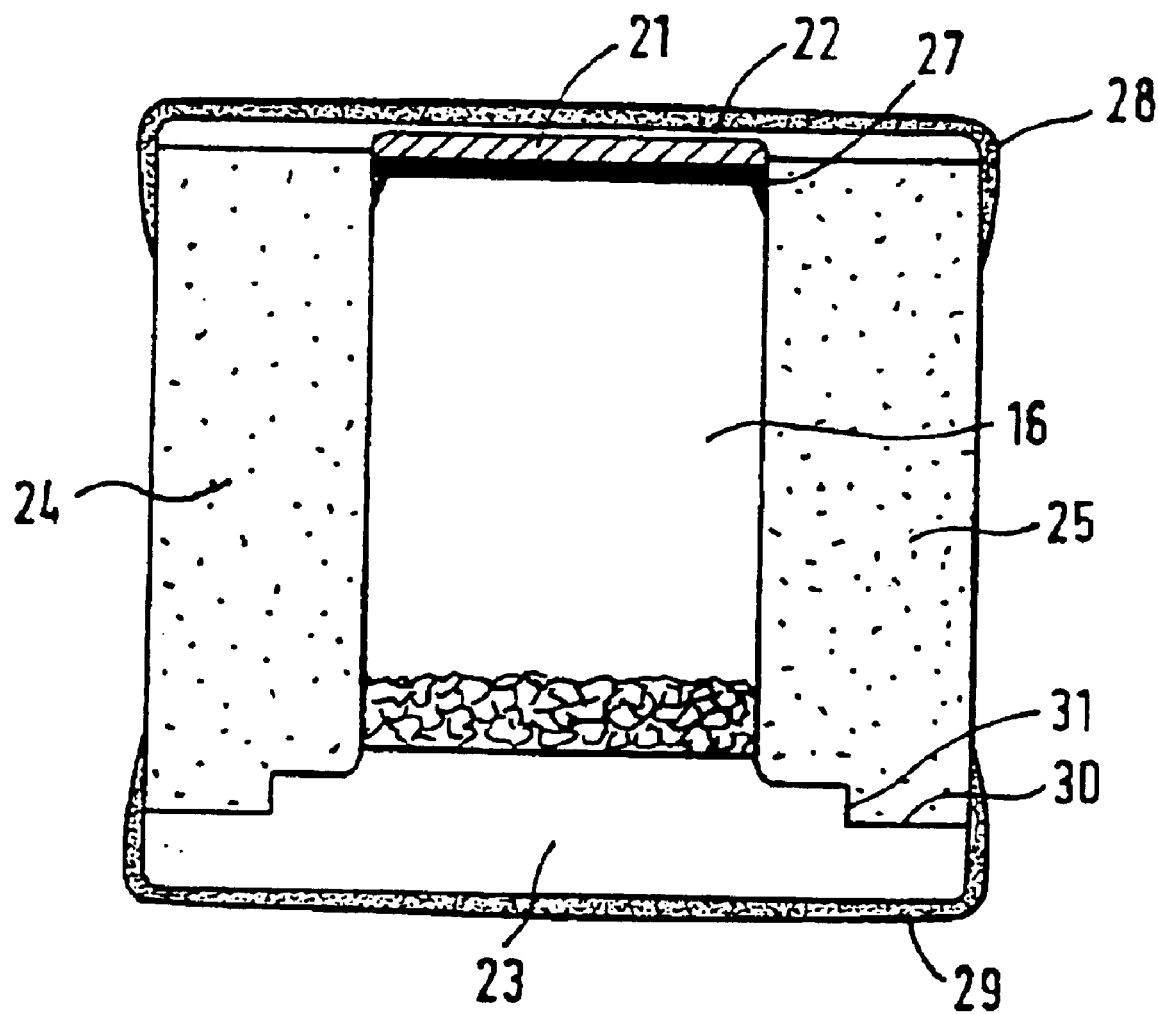

MANUFACTURE OF SOLID STATE CAPACITORS

The present invention concerns the field of solid state capacitors and relates particularly to massed production methods for manufacturing solid state capacitors.

BACKGROUND OF THE INVENTION

A massed production method for solid state tantalum capacitors is described in U.S. Pat. No. 5,357,399 (inventor Ian Salisbury). This method involves providing a substrate wafer of solid tantalum, forming a sintered, highly porous, layer of tantalum on the substrate, sawing the layer of porous tantalum with an orthogonal pattern of channels to produce an array of upstanding porous tantalum rectilinear bodies, anodising the bodies to form a dielectric layer thereon, dipping the bodies in manganese nitrate solution and heating to convert the applied solution to manganese dioxide thereby to form a cathode layer, applying respective conducting layers of carbon and then silver onto top ends of each body, bonding a lid consisting of a wafer of solid metal onto the silver layer; injecting insulating resin material into the channels between bodies constrained by the substrate and lid; and slicing the assembly in a direction perpendicular to the plane of the wafers and along the centre line of each channel thereby to produce a plurality of capacitors in which the anode terminal consists of substrate material, the cathode terminal consists of lid material and the capacitive body consists of the coated porous tantalum body.

Our pending application PCT/GB99/03566 (corresponding to UK application number 9916047.5), describes a variation on the Salisbury method, in which the lid layer is omitted. In capacitors manufactured according to this method the volumetric efficiency of each capacitor produced is maximized.

SUMMARY OF THE INVENTION

It is an object of the present invention to provide an improved method of manufacturing solid state capacitors, particularly a method which is simpler and generates less waste material.

According to one aspect of the present invention there is provided a method of manufacturing multiple solid state capacitors comprising:

providing a substrate layer;

forming on a surface of the substrate layer a plurality of upstanding bodies consisting of porous sintered valve-action material;

forming an insulating layer on and extending through the porosity of the bodies;

forming a conducting cathode layer on the insulating layer;

and forming cathode termination means on a top portion of each body; and dividing the processed substrate to form a plurality of individual capacitor bodies in each of which a portion of the substrate forms an anode terminal, a porous body is an anode terminal with cathode termination means provided on a top portion thereof, characterised in that the upstanding porous bodies are formed by (i) providing a mixture of valve-action material powder and binder, (ii) configuring the mixture into a plurality of bodies on the substrate while the mixture is in the green state and (iii) thereafter sintering the bodies.

The green forming may involve a pressing process for example with the use of a combination die and punch set in which a die is formed with a plurality of holes corresponding to the desired body shapes and distribution and a plurality of punches are used to press green mixture placed in the holes onto the substrate. The die pressing process may be repeated to build up layers of green material in each individual body.

In preferred embodiments the valve-action material is a metal, especially tantalum. However other valve-action metals and materials may be used in the process of the present invention. Examples of suitable materials are niobium, molybdenum, silicon, aluminium, titanium, tungsten, zirconium, and alloys thereof and in addition valve action oxide materials. Particularly preferred examples of suitable metals are niobium and tantalum.

When the valve action metal is tantalum the substrate is preferably a solid tantalum wafer, thereby ensuring physical and chemical compatibility with the porous metal. In general, the substrate should be compatible with the valve-action material. Typically the substrate material will consist of solid valve action material.

A seeding layer of coarse grade powder may have to be applied to the substrate and sintered thereto before finer grade green powder/binder mixture is pressed onto the substrate to form the upstanding bodies. The coarse grade powder provides mechanical keying ensuring that a strong connection between the sintered porous bodies and the substrate is produced. The strong connection is necessary to ensure that separation of the porous bodies from the substrate does not occur during subsequent steps in the manufacturing process.

Preferably, the seed layer is only laid down on the substrate in positions where the porous bodies will stand. Hence, according to another aspect of the invention, there is provided a method of manufacturing multiple solid state capacitors comprising:—providing a substrate layer;—forming on a surface of the substrate layer a plurality of upstanding bodies consisting of porous sintered valve-action material;—forming an insulating layer on and extending through the porosity of the bodies;—forming a conducting cathode layer on the insulating layer;—and forming cathode termination means on a top portion of each body; and—dividing the processed substrate to form a plurality of individual capacitor bodies in each of which a portion of the substrate forms an anode terminal, a porous body is an anode terminal with cathode termination means provided on a top portion thereof, wherein before formation of the valve-action bodies on the substrate a seeding layer of relatively coarse grain material is provided on the substrate, characterised in that the seeding layer is provided as an array of seeding tabs is formed on the substrate.

Preferably the tabs comprises the same valve-action material as the upstanding bodies. The tabs may be formed by application of a screen printing layer having the desired distribution of tabs. Alternatively stencilling may be use to lay down the appropriate pattern of tabs. The method is not limited to these two and may include other methods of applying a suitable array of seeding material tabs. An advantage of laying down an array of seeding tabs is that the conventional machining of a uniform seeding layer is bypassed. In addition waste of the seeding layer material is reduced, with an accompanying economic and environmental benefit.

In a preferred embodiment, the tabs are laid down by screen printing of a paste of relatively coarse valve action material powder in the required pattern onto the substrate.

After laying down, the array of tabs is typically then sintered to fix the pattern of seeding tabs in place.

It is not strictly necessary to lay down an array of tabs in the method of the present invention, and in an alternative embodiment, a uniform layer can be applied to the substrate, fixed by sintering and then machined to remove selectively seeding layer in order to produce the required pattern of seeding tabs.

The cathode termination means may comprise one or more conducting layers applied to a top portion of the upstanding bodies. the cathode termination means may comprise metal plate portions applied to each upstanding body.

In one embodiment the termination means comprises a solid valve action metal lid applied to sandwich the upstanding bodies between the lid and the substrate. The lid is preferably divided along with the substrate to form the individual capacitor bodies in each of which the lid portion is a cathode terminal. Such a method is fully described in U.S. Pat. No. 5,357,399 and is not further described herein.

In another embodiment the lid is omitted and conducting material termination layers are applied to the top end regions of the upstanding bodies to form the cathode terminals of each capacitor.

Space between the upstanding bodies on the substrate is preferably filled with an insulating material. In one preferred embodiment the space is filled with an insulating plastics resin material, such as epoxy resin. In this way when the substrate is divided each capacitor body may be left with a protective resin sleeve about the porous body portions thereof.

According to a further aspect of the invention there is provided a capacitor produced by any method hereinbefore described.

According to another aspect of the invention there is provided an electronic or electrical device comprising a capacitor made by any method hereinbefore described.

The dielectric layer may be formed by an electrolytic anodization process in which an oxide film is carefully built up on the surface of the porous sintered anode body. Suitable methods will be known to the person skilled in the art.

The cathode layer may be formed by dipping the anode bodies into a cathode layer precursor solution such as manganese nitrate and then heating to produce a cathode layer of manganese dioxide. Repeated dipping and heating steps may be carried out in order gradually to build up the required depth and integrity of cathode layer.

Typically, during the dipping process the cathode layer will be built up not only on the anode bodies, but also on the exposed tantalum substrate surface between bodies. In order that each cathode terminal is isolated from its respective anode terminal a further process step may be carried out to remove any cathode layer (and dielectric layer) from the substrate around each anode body. This process may involve a further machining process in which isolating channels are formed between each anode body by removal of a surface layer of substrate. For example, where orthogonal rows have been machined to form rectilinear anode bodies, isolating channels may be machined along the centre lines of the rows and columns between anode bodies. In this way, a step is formed in the perimeter of each capacitor anode body, which step has an un-coated surface, thereby isolating the cathode layer from the exposed anode terminal.

With the application of the cathode layer, the anode body becomes a capacitive body comprising an anode portion consisting of an interconnected matrix of: metal powder; dielectric insulating layer of metal oxide; and a conducting cathode layer of doped oxide.

The encapsulating resin may be applied under pressure or by simple immersion depending upon the suitability and fluidity of the particular resin. Once the resin has set, the resin and substrate may be machined or otherwise cut to separate adjacent capacitor bodies. The encapsulation material may be a plastics resin, such as epoxy.

Following is a description by way of example only and with reference to the drawings of one method of putting the present invention into effect.

BRIEF DESCRIPTION OF THE DRAWINGS

FIG. 6 shows sectional view from one side of a capacitor produced according to the method of the present invention.

BRIEF DESCRIPTION OF THE PREFERRED INVENTION

Figure 1:
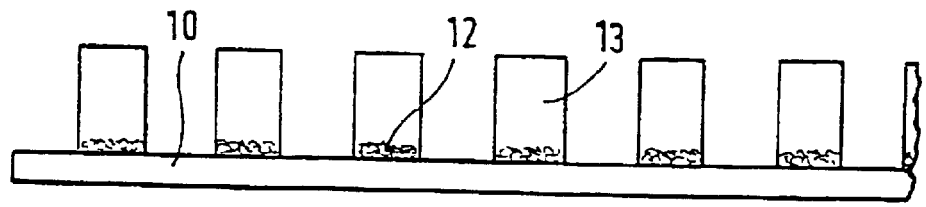
FIGS. 1 and 3 to 5 are cross-sectional views of a substrate during processing according to one embodiment of the present invention.

A transverse section through a solid tantalum wafer is shown as 10 in FIG. 1. An upper surface of the wafer has sintered thereon a plurality of seeding tabs 12. The seeding tabs comprise a thin layer of coarse grained capacitor grade tantalum powder 12. The seeding layer is preferably applied by screen printing of a green paste of coarse powder in an orthogonal pattern (or "check") of rectilinear tabs. The tabs are then sintered to fix to the substrate. A green (i.e. un-sintered) mixture of fine-grained capacitor grade tantalum powder is then pressed onto the upper surface of the substrate to form a green layer 13. A punch and die combination press is used to shape the flowable green mixture to form the upstanding rectilinear bodies 16, shown in FIG. 2.

Figure 2:
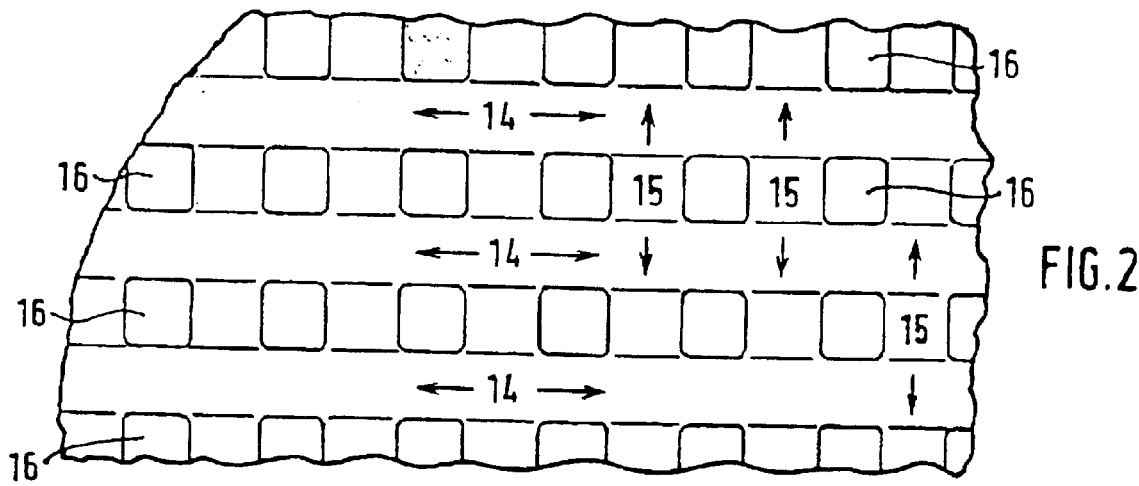
FIG. 2 is a view from above of the substrate after green forming step in the process.
Figure 3:
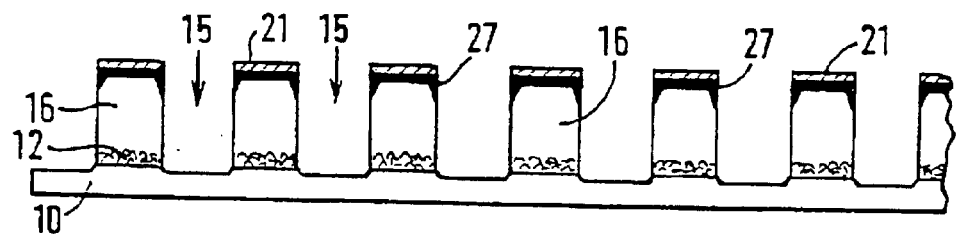
Figure 7A:
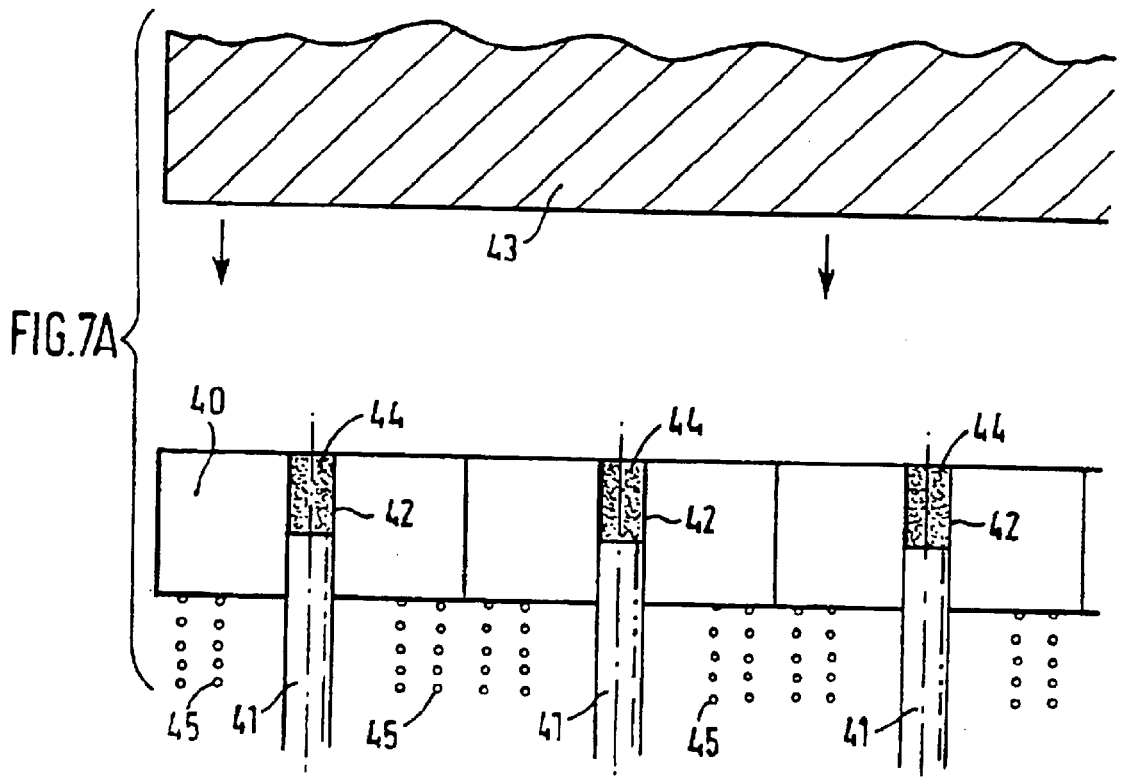
FIG. 7 shows a press to form the upstanding bodies.
Figure 7B:
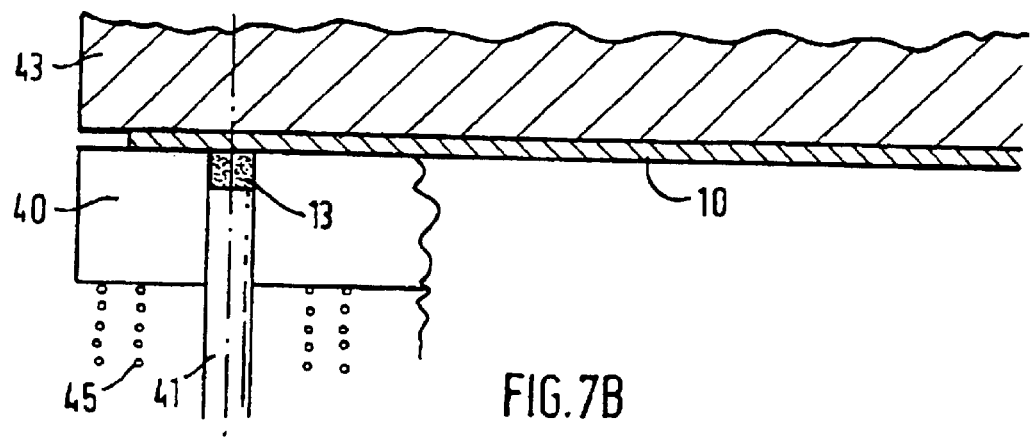

The press is shown in FIG. 7. The press comprises a bottom die 40 and series of punches 41. The die is formed with an array of rectangular section holes 42, arranged in rows and columns corresponding to the intended distribution of anode bodies on the substrate. The die holes are filled with green tantalum mixture 44. The substrate 10 is then placed on top of the die, with the seeding tabs (not shown) aligned with the holes. A top patten 43 is then clamped down onto the substrate as shown in FIG. 7B. The clamped assembly is pressed down onto the punches. The punches compress the charge of green mixture in each hole and attach each charge to the substrate. A mechanical stop (not shown) is used to limit die travel, and prevent over-densification of the green charges. The plattern is then released and separated from the die. A series of light springs 45 which support the weight of the die, push the die and substrate away from the punches on release of the plattern, leaving an array of green rectangular section bodies attached to the substrate, as shown in FIG. 2. The pressing process may be repeated to produce the required height of green body by building up layers of green material.

The green bodies are sintered to fuse the fine grained powder into an integral porous network in each body. The sintering is carried out at around 1600 degrees centigrade (the optimum temperature will depend upon the grain size and the duration of the sintering process). The sintering process also fuses the porous bodies to the coarse seeding layer 12.

The formed bodies define an orthogonal grid of transverse channels 14 and longitudinal channels 15 as shown in FIG. 2.

The porous bodies form the anode portions of the capacitors. An insulating dielectric layer (not shown) is applied to the anode bodies by anodizing in an electrolyte bath (of e.g 0.1% phosphoric acid solution) while connecting the positive terminal of a D.C. power supply to the substrate. This results in the formation of a thin tantalum pentoxide layer on the metal porous surface of the bodies and exposed substrate.

A cathode layer (not shown) is then formed on the anode bodies by the well known manganization process. In this process the anodized anode bodies 16 are immersed in manganese nitrate solution to leave a coating of wet solution on each body and covering its internal porosity. The substrate is heated in moist air to convert the coating of nitrate to the dioxide. The immersion and heating cycles may be repeated as many as 20 times or more in order to build up the required coherent cathode layer.

In order to ensure that any dielectric or cathode layer formed on the substrate surface perimeter of each anode body is isolated, a further machining step is carried out in which an orthogonal pattern of channels 32 is sawn into the substrate surface, along the centre lines separating each anode body.

Once the manganization is complete the manganized bodies are coated with an intermediate layer 27 of conducting carbon by dipping into a bath of liquid carbon paste. After the carbon layer has set, a further intermediate layer 21 of silver is coated onto the carbon layer by dipping of the carbon-coated bodies into a liquid silver paste. The silver layer is not allowed to pass beyond the carbon layer 27 in order to ensure that silver does not directly contact the incompatible oxide layer. The silver layer 21 is then allowed to set solid.

A solid sheet 9 of tantalum is then coated on one surface thereof with a layer 5 of PTFE as a release agent. A uniform layer of silver paste 22 is then applied to the exposed surface of the PTFE. The sheet is then placed silver-side down onto the top ends of the bodies 16 to from a lid 9 shown in FIG. 4.

Downwards pressure is applied to a top side of the sheet in order to force the immobilized paste 22 to flow into intimate adhesive contact with the intermediate silver layer 21. In addition the contact is further enhanced by the paste flowing to a small extent down the side walls of each capacitor, but not beyond the carbon layer.

Figure 4:
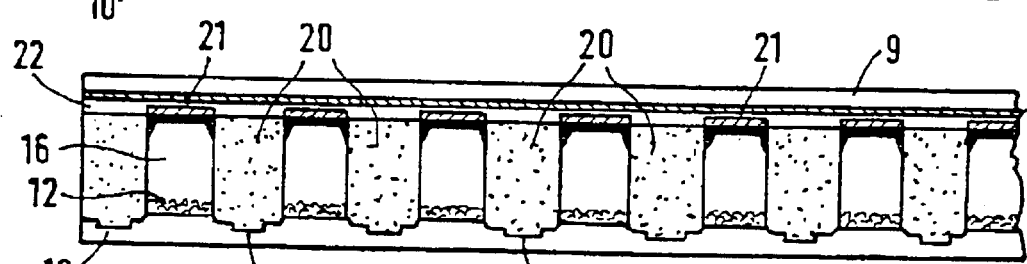

With the lid in place, the channels 14,15 between the capacitor bodies are filled with liquid epoxy resin 20 as shown in FIG. 4. The resin surrounds the sides of each capacitor body, up to the level of the lid paste 22. The channels are filled by injection under pressure of the resin, thereby ensuring complete filling of the space defined by the channels. The structural constraint provided by the tantalum lid 9 maintains the integrity of the intermediary layers 27,21 and 22 during the encapsulation process.

Figure 5:
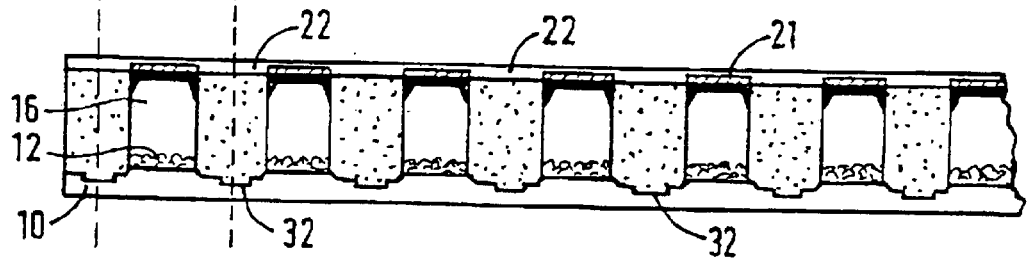

When the resin 20 has set, the lid sheet is removed. The PTFE layer 5 readily separates from the set silver layer 22, leaving the upper end region of each body coated in a solid silver layer. The presence of the lid 9 ensures that a flat top surface layer 22 is formed after removal of the lid, as shown in FIG. 5.

The wafer may now be sliced along the centre line (shown as dashed lines in FIG. 5) of each channel 14,15 in order to separate each capacitor body from its neighbours. The resulting individual capacitor structure is shown in FIG. 6. Each capacitor consists of an anode terminal portion 23 consisting of the substrate material. Upstanding from the substrate is the capacitor body 16 which is sheathed in epoxy resin sidewalls 24,25. The step 30,31 in the substrate corresponds to the machine isolation channels 32 formed in the original substrate wafer. This step is free of manganized coating and any other contaminant, and therefore ensures that the exposed anode terminal is isolated from the cathode terminal. The top end region of each capacitor is coated in a layer of carbon paste 27, a layer of silver paste 21 and a further layer of silver paste 22 which forms a cathode terminal portion of the component.

A final processing stage is a five-sided termination process. This is a well known process in the electronics industry which involves the formation of end caps 28,29 which form the external terminals of the capacitor. The termination layer metal may consist of discrete layers of silver, nickel and tin (preferably in that order). These are suitable metals for forming electrical connections by soldering of the capacitor terminals to contacts or other components of an electrical or electronic circuit.

The present invention is an elegant adaptation of the previous known process which provides a significant improvement in the economic efficiency of the process. The grinding steps of known processes, and their inevitable production of waste tantalum powder, is bypassed. This simplifies the production machinery by removing the need for the expensive grinding apparatus. Instead of grinding away sintered porous layer to form the bodies the powder/binder mixture is formed while green. In this case it is easy to re-use or recycle excess green mixture.

What is claimed is:

1. A method of manufacturing multiple solid state capacitors comprising:

providing a substrate layer;

forming on a surface of the substrate layer a plurality of upstanding bodies consisting of porous sintered valve-action material by (i) providing a green mixture of a first valve-action material powder and binder, (ii) pressing of the green mixture onto the substrate and configuring the mixture into a plurality of bodies on the substrate while the mixture is in the green state and (iii) thereafter sintering the bodies;

forming an insulating layer on and extending through the porosity of the bodies;

forming a conducting cathode layer on the insulating layer;

forming cathode termination means on a top portion of each body; and dividing the processed substrate to form a plurality of individual capacitors for each of which one end corresponding to the substrate forms an anode terminal, a porous body is a capacitive portion and an opposite end is provided with cathode termination means to form a cathode terminal, characterized in that the pressing and configuring of the green mixture into a plurality of bodies is conducted by means of a die and punch combination in which the die is formed with an array of holes corresponding to the required body sections and body distributions, green mixture is placed into the plurality of holes and a plurality of punches entered into the holes while the die and substrate are provided in adjacent contact with one another press a green mixture charge in each hole onto the substrate, after which point the die and substrate are separated leaving the plurality of upstanding bodies.

2. A method as claimed in claim 1 wherein the die/punch pressing process is repeated to build up further layers of green mixture in each body.

3. A method as claimed in claim 1 or claim 2 wherein a seeding layer of a second valve action material powder is applied to the substrate and sintered thereto before the bodies are pressed and configured onto the substrate, thereby to provide mechanical keying between the porous bodies and the substrate.

4. A method as claimed in claim 1 or claim 2 wherein an array of seeding tabs, each tab comprising a sintered layer of a second valve action material powder, is formed on the substrate in a pattern corresponding to the intended position of the green bodies, and the green bodies are formed on the seeding tabs, thereby to enhance the bond between each body and the substrate.

5. A method claimed in claim 4 wherein the seeding tabs are applied by screen printing of a paste of valve-action powder in a pattern corresponding to the array, and the paste is sintered to fix the pattern in place on the substrate.

6. A method as claimed in claim 4 wherein the seeding tabs are applied by applying a layer of a paste of valve-action powder over a stencil to form a pattern corresponding to the army, and the paste is sintered to fix the pattern in place on the substrate.

\* \* \* \* \*

UNITED STATES PATENT AND TRADEMARK OFFICE
CERTIFICATE OF CORRECTION

PATENT NO.     : 6,849,292 B1
DATED          : February 1, 2005
INVENTOR(S)    : David Huntington It is certified that error appears in the above-identified patent and that said Letters Patent is hereby corrected as shown below:

<u>Column 8,</u>
Line 8, please delete "army" and replace with -- array --.

Signed and Sealed this

Twelfth Day of July, 2005

JON W. DUDAS
*Director of the United States Patent and Trademark Office*